United States Patent
Adame et al.

(10) Patent No.: US 6,179,543 B1
(45) Date of Patent: Jan. 30, 2001

(54) RACK FOR MOTOR VEHICLES

(76) Inventors: Dennis Adame, 6705 Cotton, Houston, TX (US) 77092; Santos O. Barbosa, 660 Maxey Rd., #245, Houston, TX (US) 77013; Jose G. Cardona, 8100 Sandspoint, #3107, Houston, TX (US) 77036; Michael E. Harrison, 2900 S. Gessner, #2110, Houston, TX (US) 77063

( * ) Notice: Under 35 U.S.C. 154(b), the term of this patent shall be extended for 0 days.

(21) Appl. No.: 09/082,589

(22) Filed: May 21, 1998

(51) Int. Cl.$^7$ .................................................. B60R 9/040
(52) U.S. Cl. .............................................. 414/462; 224/310
(58) Field of Search ..................................... 224/309, 310, 224/321, 322, 323, 324, 325, 326, 327, 329, 330; 414/462, 546

(56) References Cited

U.S. PATENT DOCUMENTS

| | | |
|---|---|---|
| 2,492,841 | 12/1949 | Burkey . |
| 3,141,565 | 7/1964 | Cain . |
| 3,862,390 | 1/1975 | Watson . |
| 3,963,136 | 6/1976 | Spanke . |
| 4,008,838 | 2/1977 | Correll . |
| 4,081,095 | 3/1978 | Wilburn et al. . |
| 4,170,331 | 10/1979 | Faulstich . |
| 4,240,571 | 12/1980 | Ernst . |
| 4,262,834 | 4/1981 | Nutt . |
| 4,291,823 | 9/1981 | Freeman et al. . |
| 4,339,223 | 7/1982 | Golze ................................ 414/462 |
| 4,350,471 | 9/1982 | Lehmann ........................... 414/463 |
| 4,390,117 | 6/1983 | Fagan . |
| 4,808,056 | 2/1989 | Oshima ............................. 414/462 |
| 4,826,387 | 5/1989 | Audet ............................... 414/462 |
| 4,887,750 | 12/1989 | Dainty . |
| 5,058,791 | 10/1991 | Henriquez et al. . |
| 5,104,280 | 4/1992 | Ziaylek et al. ................... 414/462 |
| 5,209,628 | 5/1993 | Hassell ............................. 414/462 |
| 5,297,912 | 3/1994 | Levi ................................. 414/462 |
| 5,360,151 | 11/1994 | Fine . |
| 5,398,778 | 3/1995 | Sexton . |
| 5,421,495 | 6/1995 | Bubik et al. . |
| 5,791,857 | * 8/1998 | Ziaylek, Jr. et al. ............. 414/462 |

OTHER PUBLICATIONS

The Crown Divisions of TransPro, Inc. 1997 Commercial Van Equipment Catalogue, pp. 29–33.
The Crown Divisions of TransPro, Inc. 1997 Commercial Pickup Equipment Catalogue, pp. 4 & 7.

\* cited by examiner

*Primary Examiner*—Janice L. Krizek
(74) *Attorney, Agent, or Firm*—Keeling Law Firm (57) ABSTRACT

A ladder rack for motor vehicles including at least two support mechanisms for supporting an item such as a ladder, a pivot for concurrently pivoting each of the support mechanisms between a first position and a second position, and a motion stabilizer mechanism mounted on each of the support mechanisms. In the first position, each of the support mechanisms is disposed above the vehicle. When in the first position, the item is secured on the support mechanisms against movement. In the second position, each of the support mechanisms is securely disposed adjacent to a side of the vehicle thereby enabling easy loading and unloading of the ladder from the rack. The motion stabilizer mechanism stabilizes and guides the motion of the ladder as the rack is moved between the first and second positions. In the preferred embodiment, the support mechanism width is adjustable to accommodate various sized ladders.

31 Claims, 6 Drawing Sheets

RACK FOR MOTOR VEHICLES

BACKGROUND OF THE INVENTION

1. Field of Invention

This invention relates generally to motor vehicle racks used to carry large, burdensome items such as ladders, pipes, and cable. More specifically, this invention relates to such racks which can be moved between two positions, [1] a first secured position generally utilized when the vehicle is in motion wherein the rack is securely disposed above the motor vehicle and the item is secured on the rack and [2] a second accessible position generally utilized when the item is being loaded and unloaded from the rack wherein the rack is adjacent to one side of the motor vehicle.

2. Related Art

A number of different racks exist in the prior art. Illustrative of such movable racks are U.S. Pat. No. 5,058,791 issued to Henriquez et al. on Oct. 22, 1991; U.S. Pat. No. 5,297,912 issued to Levi on Mar. 29, 1994; and U.S. Pat. No. 5,398,778 issued to Sexton on Mar. 21, 1995.

Each invention described in the listed patents includes a number of pivot points and/or rotating elements. Rotating elements and pivot points are inherently weak points in a design. Thus, it would be beneficial to the art to provide a rack having a minimal number of pivot points and rotating elements thereby increasing the overall strength of the rack.

In addition, none of the racks described in the listed patents are adjustable to securely carry items, specially ladders, having different widths. Thus, it would be beneficial to the art to provide a rack which is adjustable enabling it to securely carry ladders and other items having different widths.

Furthermore, the great majority of prior art racks that are movable between a secured position and an accessible position experience an instability problem as the rack is moved between the two positions. The instability problem is caused by the sudden extra weight contributed by the ladder once the center of gravity of the ladder moves "overcenter". This sudden extra weight provides an abrupt "jerk" on the operator's hold which may cause the operator's hold on the pivoting arm of the rack to slip, potentially resulting in property damage to the ladder, rack, and/or vehicle. Thus, it would be beneficial to the art to provide a rack which does not experience the instability problem experienced by prior art racks.

Finally, a number of different types of work vehicles exist, including vans and pick-up trucks, most of which have the need for a rack. Each vehicle type has different overall dimensions. In addition, obvious structural differences exist between pick-up trucks and vans which affect the placement and attachment of a rack to the vehicle. Thus, it would be beneficial to the art to provide a rack that is adjustable to fit a large number of vehicle types.

SUMMARY OF THE INVENTION

Accordingly, the objectives of this invention are to provide, inter alia, a motor vehicle rack that:

- includes a minimal number of pivot points and rotating elements thereby increasing the overall strength of the rack;
- is adjustable enabling it to securely carry items having different widths;
- does not experience the instability problem experienced by prior art racks; and
- is adjustable to fit a large number of vehicle types.

To achieve such improvements, my invention is a ladder rack for motor vehicles including at least two support mechanisms for supporting an item such as a ladder, a pivoting means for concurrently pivoting each of the support mechanisms between a first position and a second position, and a motion stabilizer mechanism mounted on each of the support mechanisms. In the first position, each of the support mechanisms is securely disposed above the vehicle over the vehicle's roof. When in the first position, the item is secured on the support mechanisms against movement. In the second position, each of the support mechanisms is disposed adjacent to a side of the vehicle thereby enabling easy loading and unloading of the ladder from the rack. The motion stabilizer mechanism stabilizes and guides the motion of the ladder as the rack is moved between the first and second positions. In the preferred embodiment, the rack additionally includes a width adjustment means for adjusting the ladder size carrying capacity of the support mechanisms.

DETAILED DESCRIPTION OF THE INVENTION

The preferred embodiment of my invention is shown in FIGS. 1 through 11 and the rack is depicted as 5. It is understood that rack 5 may support any of a variety of large and burdensome items as previously listed. However, because ladders are the most common item carried by comparable racks, a ladder 15 will be the item illustrated and described herein as being carried by rack 5. Furthermore, as part of the inventive concept, rack 5 includes parts specially made for the transportation and securement of a ladder 15.

Figure 1:
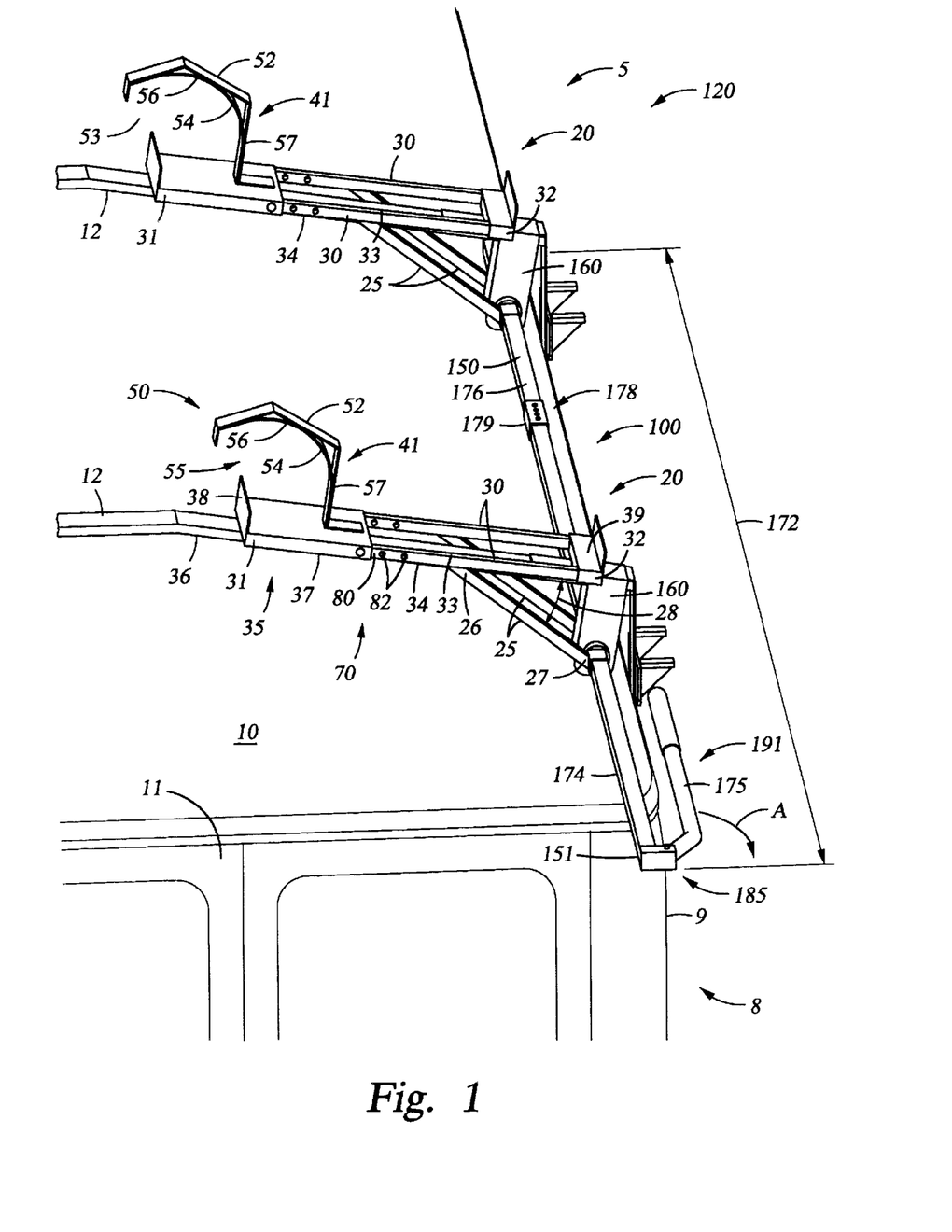
FIG. 1 is an isometric view of the rack in the first position attached to a van-type vehicle.
Figure 2:
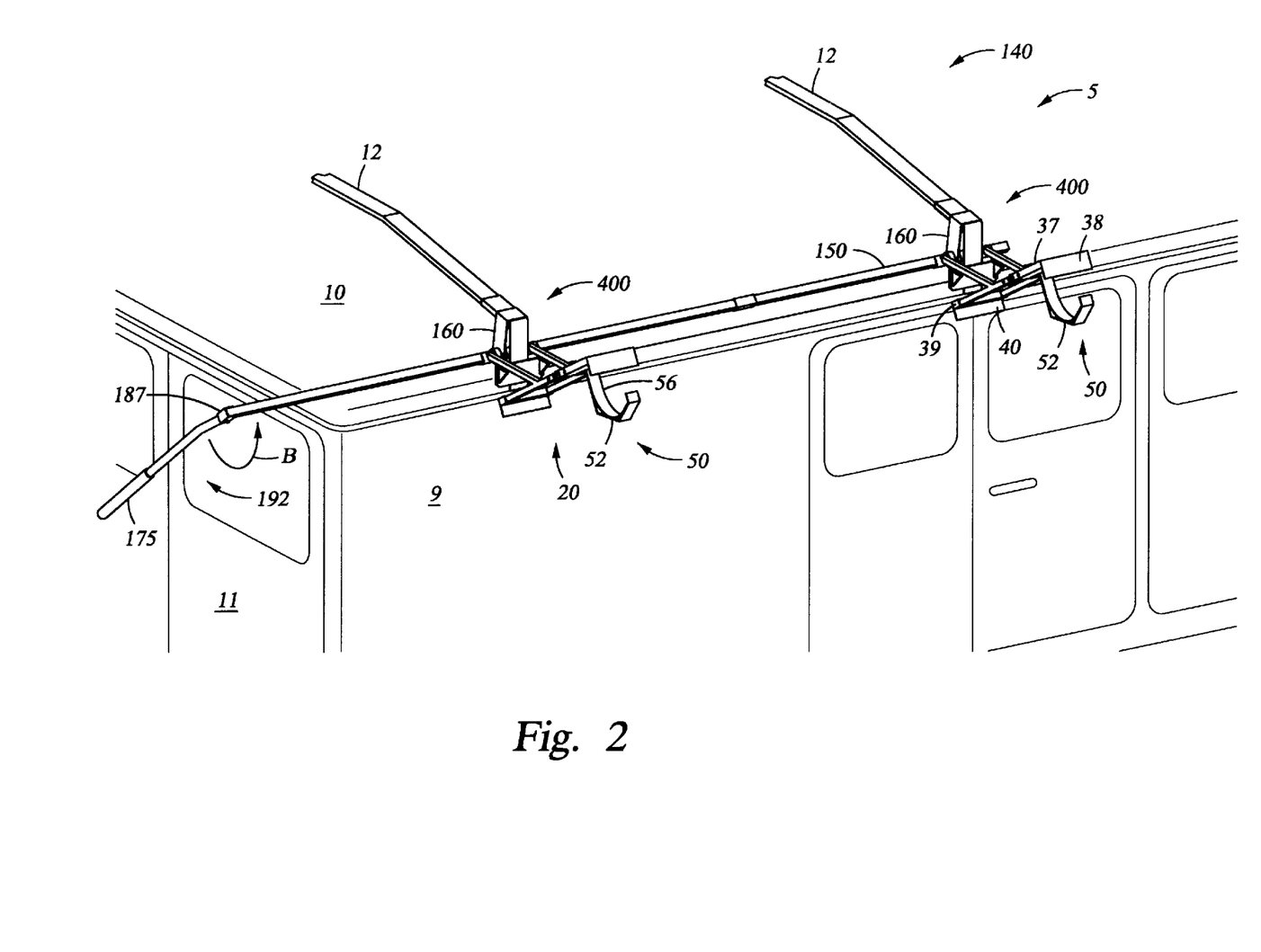
FIG. 2 is an isometric view of the rack in the second position attached to a van-type vehicle.
Figure 6:
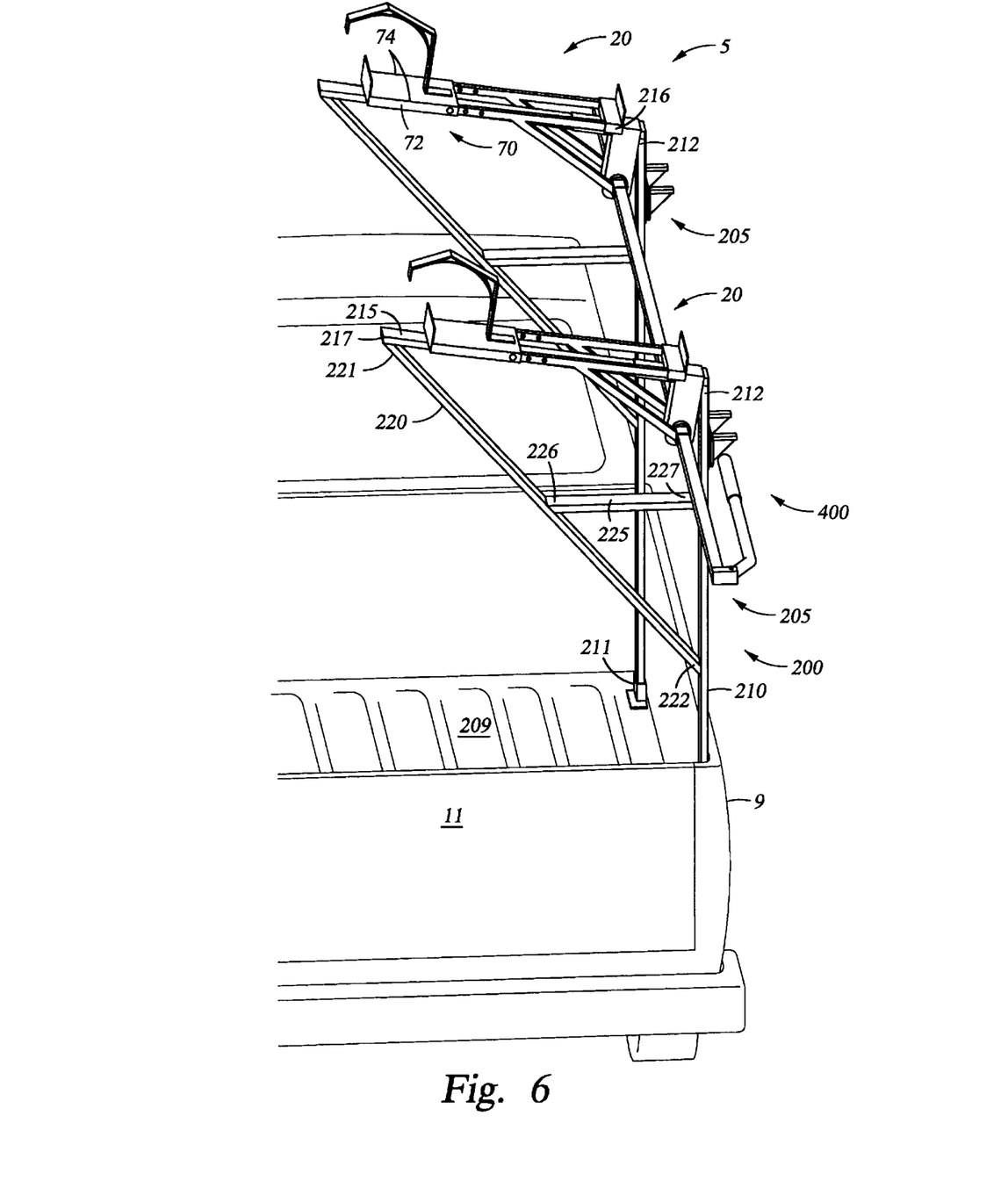
FIG. 6 is an isometric view of the rack in the first position attached to a pickup truck-type vehicle.
Figure 9:
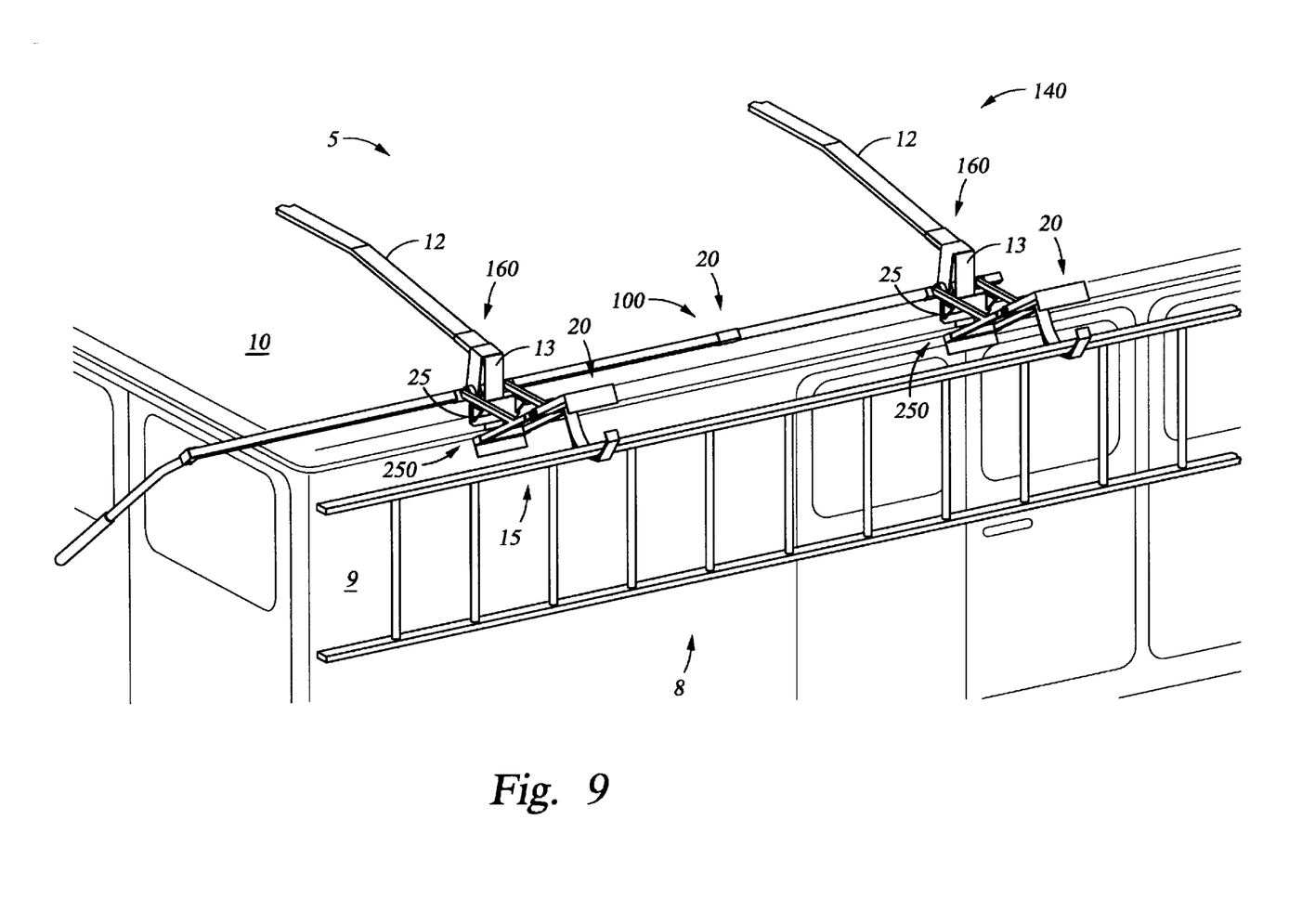
FIG. 9 is an isometric view of the rack in the second position with a ladder thereon, said rack attached to a van-type vehicle.
Figure 10:
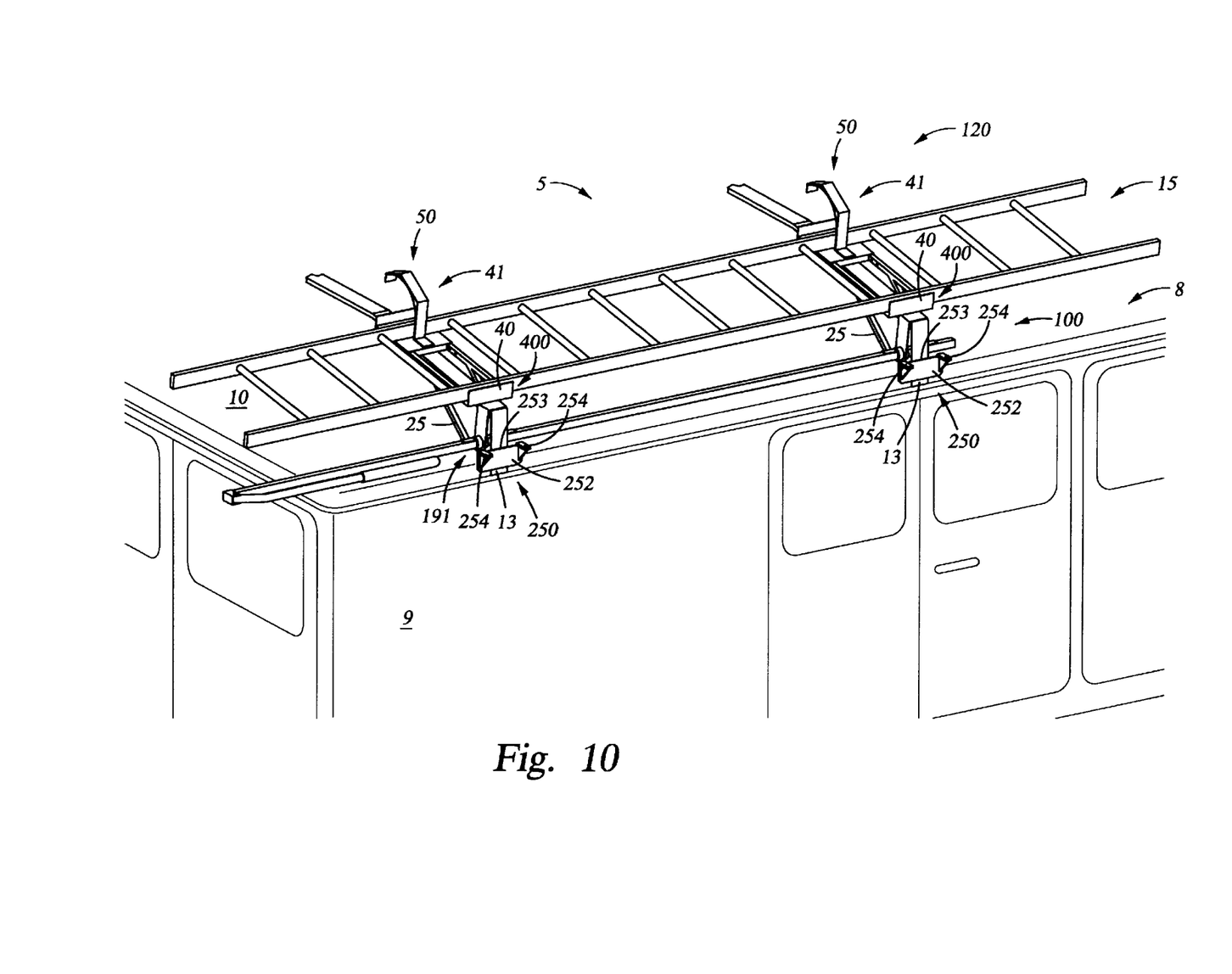
FIG. 10 is an isometric view of the rack in the first position with a ladder thereon, said rack attached to a van-type vehicle.

In general, rack 5 comprises at least two support mechanisms 20, a pivoting means 100, a motion stabilizer mechanism 50, and a mounting means 400. Ladder 15 rests on support mechanisms 20. Mounting means 400 fixedly attaches pivoting means 100 to vehicle 8. Pivoting means 100 pivots each of the support mechanisms 20 between a first position 120 (as shown in FIGS. 1, 6, and 10) and a second position 140 (as shown in FIGS. 2 and 9). In the first position 120, the support mechanisms 20 are securely disposed above a motor vehicle 8 with ladder 15 securely resting on the support mechanisms 20. First position 120 is usually employed when vehicle 8 is in motion and/or when ladder 15 is required to be secured in place. In the second position 140, the support mechanisms 20 are disposed adjacent to a side 9 of vehicle 8 thereby permitting ladder 15 to be easily loaded or unloaded from vehicle 8. Second position 140 is normally utilized when an operator loads or unloads ladder 15 from rack 5. Motion stabilizer mechanism 50 stabilizes and guides the motion of ladder 15 ensuring that the transition of rack 5 between first position 120 and second position 140 is smooth, steady, and not erratic.

Each support mechanism 20 comprises at least one support bar 30, at least one link bar 25, a securing mechanism 35, and a width adjustment means 70. Ladder 15 rests on support bar(s) 30. Link bar 25 links support bar 30 to pivoting means 100. Securing mechanism 35 secures ladder 15 to support mechanism 20 while support mechanism 20 is in first position 120.

Each support bar 30 is constructed from a high strength and low weight material such as steel or aluminum. Preferably, each support bar 30 consists of square or round tubing. In the preferred embodiment, each support mechanism 20 comprises two support bars 30 in general parallel relationship and joined together, by brackets, 37 and 39, as will be explained herein.

Each support bar 30 includes a first end 31, a second end 32, a bottom surface 33, and a top surface 34. Support bar first end 31 is distal vehicle side 9. Support bar second end 32 is proximate and adjacent to vehicle side 9. Support bar bottom surface 33 is proximate vehicle roof 10. Support bar top surface 34 is distal vehicle roof 10.

Each link bar 25 is also constructed from a high strength and low weight material such as steel or aluminum. Also preferably, each link bar 25 consists of square or round tubing. In the preferred embodiment, each support mechanism 20 comprises two link bars 25, one link bar 25 corresponding to each support bar 30.

Each link bar 25 includes two ends, a first end 26 and a second end 27. Link bar first end 26 is fixedly attached to support bar 30. Preferably, link bar first end 26 is fixedly attached to support bar 30 at the bottom surface 33 of the support bar 30. Link bar second end 27 is fixedly attached to pivoting means 100.

The connection between support bar 30 and its corresponding link bar 25 defines an angle 28 on the vehicle side 9 of link bar 25. In the preferred embodiment, angle 28 is an acute angle. Preferably, angle 28 measures between 30° and 60°.

Securing mechanism 35 generally comprises a first bracket 37, a second bracket 39, and a third finger member 41. Securing mechanism 35 secures ladder 15 to support mechanism 20 when rack 5 is in first position 120 so that ladder 15 does not extensively move on top of or fall from the support mechanisms 20.

First bracket 37 is attached to support bar 30 adjacent the support bar first end 31. Preferably, first bracket 37 is attached to the top surface 34 of support bar 30. In the preferred embodiment in which each support mechanism 20 comprises two support bars 30, first bracket 37 is attached to both support bars 30 at the first end 31 of each support bar 30. Thus, in this preferred embodiment, first bracket 37 connects the two support bars 30 at the first end 31 of each support bar 30.

First bracket 37 includes a first bracket shoulder 38. First bracket shoulder 38 is preferably substantially perpendicular to support bar top surface 34 extending away from vehicle 8. In addition, first bracket shoulder 38 extends in a direction substantially transverse to the longitudinal axis 36 of support bar 30. Preferably, first bracket shoulder 38 is adjacent to support bar first end 31.

Second bracket 39 is attached to support bar 30 adjacent the support bar second end 32. Preferably, second bracket 38 is attached to the top surface 34 of support bar 30. In the preferred embodiment in which each support mechanism 20 comprises two support bars 30, second bracket 39 is attached to both support bars 30 at the second end 32 of each support bar 30. Thus, in this preferred embodiment, second bracket 39 connects the two support bars 30 at the second end 32 of each support bar 30.

Second bracket 39 includes a second bracket shoulder 40. Second bracket shoulder 40 is preferably substantially perpendicular to support bar top surface 34 extending away from vehicle 8. In addition, second bracket shoulder 40 extends in a direction substantially transverse to the longitudinal axis 36 of support bar 30. Preferably, second bracket shoulder 40 is adjacent to support bar second end 32.

Third finger member 41 is located on each support mechanism 20 intermediate first bracket shoulder 38 and second bracket shoulder 40. Third finger member 41 is preferably substantially perpendicular to support bar top surface 34 extending away from vehicle 8.

In the preferred embodiment, third finger member 41 is attached to first bracket 37. In an alternative preferred embodiment, third finger member 41 is attached to second bracket 39. In an alternative preferred embodiment, third finger member 41 is attached to the top surface 34 of support bar 30.

Width adjustment means 70 adjusts the distance between first bracket shoulder 38 and second bracket shoulder 40 so that ladders 15 of different widths may be secured by securing mechanism 35 therebetween.

Figure 8:
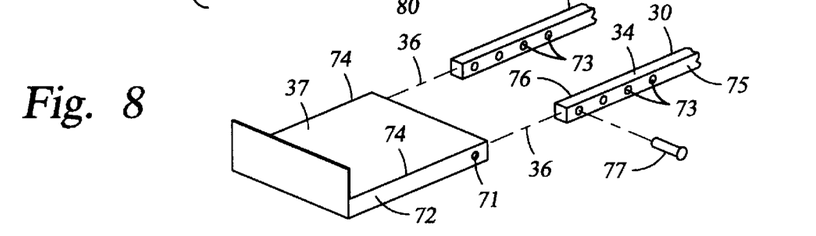
FIG. 8 is an isometric view of an alternative embodiment of the width adjustment means.

In the preferred embodiment as shown in FIGS. 6 and 8, width adjustment means 70 comprises at least one opening 71 on a first bracket sliding members 72, a plurality of holes 73 on support bar 30, and a width adjustment fastener 77. Each first bracket sliding member 72 extends from an edge 74 of first bracket 37 which is parallel to support bar longitudinal axis 36 when attached thereto. Each first bracket sliding member 72 extends in a direction perpendicular to first bracket 37 and away from first bracket shoulder 38. First bracket 37 must be sized and constructed so that each first bracket sliding member 72 is substantially adjacent to one side surface 75 of support bar 30 when first bracket 37 abuts support bar top surface 34. Preferably, first bracket 37 is sized and constructed so that each first bracket sliding member 72 is in sliding abutment with one side surface 75 of support bar 30 when first bracket 37 abuts support bar top surface 34.

In this embodiment, first bracket sliding member 72 includes at least one opening 71 therethrough. In addition, support bar 30 includes a plurality of holes 73 spaced along its longitudinal axis 36, each hole 73 preferably extending transversely through support bar 30 from support bar side surface 75 through support bar side surface 76. The opening 71 and holes 73 are located on their respective parts so that, as first bracket 37 slides on support bar 30, each opening 71 becomes axially aligned with a different hole 73 thereby defining different distances between first bracket shoulder 38 and second bracket shoulder 40. Width adjustment fastener 77 is selectively securely inserted through an axially aligned pair of opening 71 and hole 73 thereby fastening first bracket 37 to support bar 30 at the selected and required distance or width.

Figure 7:
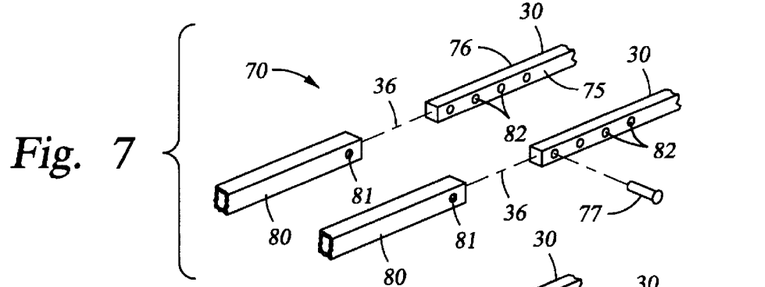
FIG. 7 is an isometric view of one embodiment of the width adjustment means.

In an alternative preferred embodiment as shown in FIGS. 1 and 7, width adjustment means 70 comprises a support bar sliding member 80 which slides within each support bar 30. In this embodiment, first bracket 37 is fixedly attached to each support bar sliding member 80. Support bar sliding member 80 is preferably constructed of round or square tubing and includes at least one opening 81 transversely therethrough. Support bar 30 includes a plurality of holes 82 along its longitudinal axis 36, each hole 82 preferably extending transversely through support bar 30 from support bar side surface 75 to support bar side surface 76. The opening 81 and holes 82 are located so that as support bar sliding member 80 slides within support bar 30, each opening 81 becomes axially aligned with a different hole 82 thereby defining different distances between first bracket shoulder 38 and second bracket shoulder 40. Width adjustment fastener 77 is selectively securely inserted through an axially aligned pair of opening 81 and hole 82 thereby fastening support bar sliding member 80 to support bar 30 at the selected and required distance or width.

In the preferred embodiment, pivoting means 100 generally comprises a pivoting shaft 150 passing through and journaled for rotation within at least one anchor brace 160. Preferably, rack 5 includes one anchor brace 160 for each support mechanism 20. Each anchor brace 160 is fixedly attached to mounting means 400, as will be described herein.

Figures 3, 4, 5, 11:
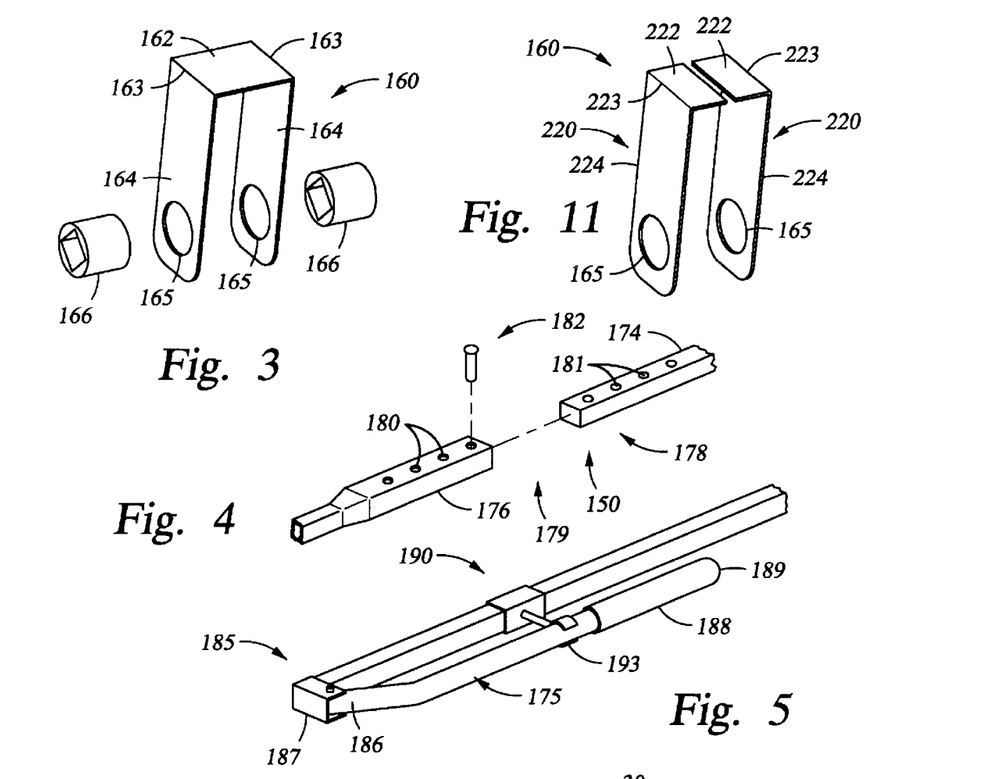
FIG. 3 is an isometric view of one embodiment of an anchor brace.
FIG. 4 is an isometric view of the pivoting shaft adjustment means of one embodiment of the pivoting shaft.
FIG. 5 is an isometric view of the pivoting lever including hinge.
FIG. 11 is an isometric view of one embodiment of an anchor brace.

In one preferred embodiment as best shown in FIG. 3, anchor brace 160 consists of one main brace component 162 and two secondary brace components 164. Main brace component 162 and both secondary brace components 164 are generally rectangular in shape. One of the secondary brace components 164 extends from one edge 163 of main brace component 162 in a direction normal to main brace component 162. The other of the secondary brace components 164 extends from the opposite edge 163 of main brace component 162 also in a direction normal to main brace component 162. Preferably, each secondary brace component 164 is identical in size and shape. The attachments of the two secondary brace components 164 to opposite edges 163 of main brace component 162 thus furnish anchor brace 160 with a generally "C"-shape.

In another preferred embodiment as best shown in FIG. 11, each anchor brace 160 consists of two preferably identical anchor brace units 220. Each brace unit 220 includes a top unit section 222 and a side unit section 224. Top unit section 222 and side unit section 224 are generally rectangular in shape. Each side unit section 224 extends from one edge 223 of its corresponding top unit section 222 in a direction normal to top unit section 222. The perpendicular attachment of each side unit section 224 to its corresponding top unit section 222 thus furnishes each anchor brace unit 220 with a generally "L"-shape.

Each secondary brace component 164 (in the embodiment shown in FIG. 3) and each side unit section 224 (in the embodiment shown in FIG. 11) includes a cavity 165 therethrough. A bearing 166, shown in FIG. 3 but not in FIG. 11, is fixedly attached within each cavity 165. Pivoting shaft 150, in turn, is received by and journals within each bearing 166. In the preferred embodiment, all cavities 165 are axially aligned.

Each link bar 25 is fixedly attached to pivoting shaft 150 so that link bar 25 rotates along with pivoting shaft 150 as pivoting shaft 150 pivots within each cavity 165 and bearing 166.

In the preferred embodiment, pivoting shaft 150 comprises a first pivoting bar member 174, a second pivoting bar member 176, a pivoting shaft adjustment means 178, and a pivoting lever 175. First pivoting bar member 174 and second pivoting bar member 176 are adjustably connected to each other by way of pivoting shaft adjustment means 178. Pivoting shaft adjustment means 178 enables the overall length 172 of pivoting shaft 150 to be adjusted and varied so that rack 5 may be utilized with vehicles 8 of different sizes and lengths. Pivoting lever 175 enables an operator of rack 5 to generate the rotational motion required to move pivoting means 100 and rack 5 between first position 120 and second position 140.

As best shown in FIG. 4, pivoting shaft adjustment means 178 preferably comprises a sliding connection 179 between first pivoting bar member 174 and second pivoting bar member 176 so that one bar member, 174 or 176, (or at least a portion thereof) slides within the other bar member, 174 or 176, (or at least a portion thereof). In this embodiment, the sliding portion of one bar member, 174 or 176, includes a plurality of openings 180.

Preferably, each of the plurality of openings 180 is located along the longitudinal length of such bar member, 174 or 176. Also in this embodiment, the sliding portion of the other bar member, 174 or 176, includes at least one aperture 181. Aperture 181 and the plurality of openings 180 are located on the sliding portions of each bar member, 174 and 176, so that each aperture 181 becomes generally co-axially aligned with each of the plurality of openings 180 as the two bar members, 174 and 176, slide in relation to each other. The coaxial alignment of aperture 181 with each opening 180 thus represents different overall pivoting shaft lengths 172.

Pivoting shaft adjustment means 178 finally comprises a fastening pin 182 which is inserted through an axially aligned pair of aperture 181 and opening 180. Fastening pin 182 secures the connection between first pivoting bar member 174 and second pivoting bar member 176 at the overall pivoting shaft length 172 necessary for the particular size and shape of vehicle 8.

As shown in FIGS. 1 and 5, pivoting lever 175 is generally tubular in shape and includes a first end 189 and a second end 186. Preferably, pivoting lever 175 includes a grip handle 188 at lever first end 189. In the preferred embodiment, pivoting lever 175 is rotatably attached at lever second end 186 to pivoting shaft 150 (or first pivoting bar member 174 in the preferred embodiment) by pivoting lever attachment means 185.

Preferably, pivoting shaft 150 (or first pivoting bar member 174 in the preferred embodiment) includes a suspended section 151 which extends past the rear 11 of vehicle 8 thereby being suspended over the ground and not the vehicle 8. Pivoting lever attachment means 185 is preferably located on suspended section 151.

Pivoting lever attachment means 185 preferably comprises a hinge 187 fixedly attached at one end to pivoting shaft 150 (or first pivoting bar member 174 in the preferred embodiment) and at its other end to pivoting lever second end 186. Pivoting lever 175 rotates on its second end 186 about hinge 187 in relation to pivoting shaft 150. In the preferred embodiment, pivoting lever 175 rotates on hinge 187 in relation to pivoting shaft 150 between two positions: [1] an inactive position 191 (as shown in FIGS. 1 and 10) in which pivoting lever 175 and pivoting shaft 150 are adjacent to and generally parallel to each other wherein the angle between pivoting lever 175 and pivoting shaft 150 is approximately zero degrees (0°), and [2] an active position 192 (as shown in FIG. 2) in which pivoting lever 175 and pivoting shaft 150 are generally perpendicular to each other wherein the angle between pivoting lever 175 and pivoting shaft 150 is approximately ninety degrees (90°).

Pivoting lever 175 and pivoting shaft 150 further include a lever locking mechanism 190 which secures pivoting lever 175 when pivoting lever 175 is in the inactive position 191. Preferably, lever locking mechanism 190 comprises a clamp 193 able to prohibit the movement of pivoting lever 175 when the vehicle 8 is in motion. Clamp 193 is fixedly attached to pivoting shaft 150, the bow brace 13 (in vans as defined herein), or vertical element 210 (in pick-up trucks as defined herein) and is selectively clamped onto pivoting lever 175.

As best shown in FIGS. 9 and 10, pivoting means 100 also preferably comprises a motion stop mechanism 250 which acts to stop the rotation of rack 5 once rack 5 has reached the second position 140 from the first position 120. Preferably, pivoting means 100 comprises one motion stop mechanism 250 for each support mechanism 20. In the preferred embodiment as best seen in FIG. 10, each motion stop mechanism 250 comprises a stop bar 252 and at least one stop pad 254. One stop pad 254 is provided for each link bar 25. Stop bar 252 is fixedly attached to mounting means 400, as will described herein. Each stop pad 254 is fixedly attached to the top surface 253 of the stop bar 252. It is critical that stop bar 252 and each stop pad 254 be sized, constructed, and attached so that each stop pad 254 is attached in the plane of rotation in which its corresponding link bar 25 travels when rack 5 is moved between the first position 120 and the second position 140. It is also essential that the vertical attachment and height of stop bar 252 and stop pad 254 and the angle 28 be sized and constructed so that each link bar 25 abuts its corresponding stop pad 254 when rack 5 is in the second position 140. In the preferred embodiment, each stop pad 254 is constructed of a resilient material, such as rubber, and has a half-disc or rectangular shape.

Motion stabilizer mechanism 50 guides and stabilizes the motion of ladder 15 ensuring that the transition of rack 5 between first position 120 and second position 140 is smooth, steady, and not erratic. In other words, motion stabilizer mechanism 50 stabilizes the motion of ladder 15 so that the extra weight provided by the ladder 15 once the center of gravity of ladder 15 is overcenter is gradually and smoothly translated to the operator's hold on grip 188 and does not result in a sudden "jerk" on the operator's hold. A motion stabilizer mechanism 50 is mounted on each support mechanism 20.

In the preferred embodiment, motion stabilizer mechanism 50 comprises a hook mechanism 52 having a straight section 57 and a hook section 58. Hook section 58 includes an open end 53 and an inner edge 54. Preferably, the straight section 57 of hook mechanism 52 comprises third finger member 41 of securing mechanism 35.

Hook mechanism 52 is attached to support mechanism 20 so that hook open end 53 is distal vehicle side 9. In the preferred embodiment including first bracket shoulder 38, hook open end 53 is proximal first bracket shoulder 38.

Hook inner edge 54 includes a slide means 55 which allows ladder 15 to slide thereon as support mechanisms 20 are pivoted between first position 120 and second position 140. Slide means 55 is preferably constructed from a smooth non-abrasive rigid material, such as aluminum. In a preferred embodiment (not shown), slide means 55 comprises a hook inner edge 54 having a smooth, flat, and continuously contoured surface. In an alternative preferred embodiment, slide means 55 comprises a slider band 56. Slider band 56 is fixed to hook inner edge 54 so that slider band 56 forms a smooth, flat, and continuously contoured surface.

The two most common types of work motor vehicles 8 include vans, as shown in FIGS. 1 and 2, and pick-up trucks, as shown in FIG. 6. The mounting means 400 for each type of work vehicle is generally different.

For van-type vehicles 8 and as best seen in FIGS. 9 and 10, mounting means 400 comprises at least two bows 12 and two bow braces 13 for each bow 12. The majority of van-type vehicles 8 are normally equipped with at least two bows 12. Each bow 12 is an elongated strip of steel, or a like metal material, which is bent at its middle. Each end of the bow 12 is attached to one of the sides of the roof 10 of the van 8 by a bow brace 13 so that the "bend" or "hump" of the bow 12 is located at the center of the roof 10 of the van 8. In van-type vehicles 8 which include bows 12 and in the embodiment of anchor brace 160 including main brace component 162, one anchor brace 160 is fixedly attached, by either its main brace component 162 or one secondary brace component 164, to each bow 12 adjacent the side 9 of the vehicle 8. In order to fit the different widths of bows 12 existing in van-type vehicles 8, a user may utilize the embodiment of anchor brace 160 which includes the two anchor brace units 220. In this embodiment, the two anchor brace units 220 are attached, by either their top unit section 222 or their side unit section 224, to each bow 12 so that the two anchor brace units 220 directly oppose each other in the transverse direction of bow 12. In van-type vehicles 8, each support mechanism 20 rests on its corresponding bow 12 when rack 5 is in the first position 120. Also, in van-type vehicles 8, a stop bar 252 (of motion stop mechanism 250) is fixedly attached to each bow brace 13.

In pick-up truck type vehicles 8 as shown in FIG. 6, mounting means 400 comprises a mounting structure 200. Each anchor brace 160 (typically two) is fixedly attached to mounting structure 200 which itself is attached to the bed 209 of the pick-up truck type vehicle 8. Preferably, mounting structure 200 comprises at least two mounting sub-structures 205, with sub-structures 205 attached at least at the front and the rear of truck bed 209. Each mounting sub-structure 205 comprises one vertical element 210, one horizontal element 215, one angular element 220, and one brace element 225.

Vertical element 210 is fixedly attached at its first end 211 to one corner of the truck bed 209. Vertical element 210 extends vertically upwards from bed 209. Horizontal element 215 is fixedly attached at its first end 216 to vertical element second end 212 and extends in a direction substantially parallel to truck bed 209. Angular element 220 is fixedly attached at its first end 221 to horizontal element second end 217 and extends towards and to vertical element 210. Angular element second end 222 is fixedly attached to vertical element 210. Brace element 225 is fixedly attached at its first end 226 to angular element 220 and at its second end 227 to vertical element 210. Preferably, brace element 225 is substantially parallel to truck bed 209. Each anchor brace 160 is fixedly attached, by either its main brace component 162 or one secondary brace component 164, to the horizontal element 215 adjacent the horizontal element first end 216. In order to fit different widths of horizontal elements 215, a user may utilize the embodiment of anchor brace 160 which includes the two anchor brace units 220. In this embodiment, the two anchor brace units 220 are attached, by either their top unit section 222 or their side unit section 224, to the horizontal element 215 so that the two anchor brace units 220 oppose each other in the transverse direction of horizontal element 215. In such truck vehicles 8, each support mechanism 20 rests on the corresponding horizontal element 215 when rack 5 is in the first position 120. Also, in pick-up truck vehicles 8, a stop bar 252 of motion stop mechanism 250 is fixedly attached to each vertical element 210 proximate horizontal element 215.

In Operation

In operation, to load a ladder 15 onto rack 5, an operator must move rack 5 from the first position 120 to the second position 140. The operator must first release lever locking mechanism 190 (clamp 193 in the preferred embodiment) enabling pivoting lever 175 to rotate on its second end 186 about hinge 187 from inactive position 191 to active position 192. As previously mentioned, once in the active position 192, the angle between pivoting lever 175 and pivoting shaft 150 is approximately ninety degrees (90°).

An operator next grips pivoting lever 175 by its handle 188 and begins to rotate the pivoting lever 175 from first position 120 in the direction of the Arrow A of FIG. 1 (the clockwise direction if facing the rear 11 of the vehicle 8). As the pivoting lever 175 is rotated in such direction, the support mechanisms 20, due to their attachment to the pivoting shaft 150, also begin to rotate in the same direction. After substantial rotation, the movement of the support mechanisms 20 and rack 5 cease because each link bar 25 impacts and is now supported by its corresponding stop pad 254. Thus, motion stop mechanism 250 stops the motion of rack 5 at the second position 140.

It is imperative that all parts be sized and constructed so that, at the second position 140, the support mechanisms 20 are adjacent the side 9 of the vehicle 8. Preferably, all parts are sized and constructed so that, at second position 140, the angle between the support mechanisms 20 and the vehicle side 9 is an obtuse angle as shown in FIGS. 2 and 9.

The operator next lifts ladder 15 onto support mechanisms 20 and deposits one of the sides 16 of ladder 15 onto the hook section 58 of the hook mechanism 52 of each support mechanism 20. Thus, the ladder 15 is suspended from its side 16 by the hook mechanism 52 of each support mechanism 20. Next, the operator must adjust the width adjustment mechanism 70 (and thereby also the first bracket shoulder 38) so that the distance between first bracket shoulder 38 and second bracket shoulder 40 is slightly larger than the width of ladder 15 (the perpendicular distance between the two sides 16 of ladder 15).

Next, the operator begins to rotate pivoting lever 175 in the direction of the Arrow B of FIG. 2 from the second position 140 into the first position 120 (rotation is in the counter-clockwise direction if facing the rear 11 of the vehicle 8). As the pivoting lever 175 is rotated in such direction, the link bars 25 lift from their respective stop pads 254, and the support mechanisms 20, due to their attachment to the pivoting shaft 150, also begin to rotate in the same direction.

As previously mentioned, motion stabilizer mechanism 50 stabilizes the motion of rack 5 and ladder 15 as the rack 5 is moved between the first position 120 and the second position 140. Initially in the second position 140, ladder 15 is suspended on the hook section 58 of the hook mechanisms 52. As the support mechanisms 20 move in the counter-clockwise direction, ladder 15 concurrently slides along and pivots about the slide means 55 of each hook mechanism 52 (slider band 56 in the preferred embodiment). The ladder 15 continues to slide along and pivot about slide means 55 until it comes to rest on support mechanism 20 as described below. The concurrent sliding and pivoting motion of the ladder 15 on slide means 55 ensures that the extra weight provided by the ladder 15 once the center of gravity of ladder 15 is overcenter is gradually and smoothly translated to the operator's hold on grip 188 and does not result in a sudden "jerk" on the operator's hold.

After substantial rotation, ladder 15 comes to rest on support mechanisms 20, and the support mechanisms 20 as well as rack 5 will once again be positioned in the first position 120. In the first position 120 and since width adjustment means 70 has already been correctly adjusted, ladder 15 rests on the support mechanisms 20 with one ladder side 16 substantially abutting first bracket shoulder 38 and the other ladder side 16 substantially abutting second bracket shoulder 40. Due to the constriction of the ladder 15 in the lateral direction by first and second bracket shoulders, 38 and 40, and due to the inherent constriction of the ladder 15 in the longitudinal direction by the rungs 17 of the ladder 15 and third finger member 41 (which is included in hook mechanism 52 in the preferred embodiment), the ladder 15 is securely held on each support mechanism 20 by securing mechanism 35.

After rotating the rack 5 from the second position 140 into the first position 120, the operator should rotate pivoting lever 175 about hinge 187. The operator should once again secure pivoting lever 175 by way of lever locking mechanism 190 (clamp 193 in the preferred embodiment).

In order to unload ladder 15 from rack 5, an operator need simply to repeat the loading steps in the reverse sequence. Once rack 5 is in the second position 140, an operator may easily lift suspended ladder 15 from the hook mechanism 52 of each support mechanism 20.

If the overall length of the pivoting shaft 150 needs to be altered in order to better fit the dimensions of vehicle 8, an operator may easily do so by adjusting the pivoting shaft adjustment means 178. The overall length 172 of pivoting shaft 150 should be such that the portion of first pivoting bar member 174 which includes pivoting lever attachment means 185 (the suspended section 151) extends past the rear 11 of vehicle 8.

The foregoing disclosure and description of the invention is illustrative and explanatory thereof. Various changes in the details of the illustrated construction may be made within the scope of the appended claims without departing from the spirit of the invention. The present invention should only be limited by the following claims and their legal equivalents.

We claim:

1. A ladder rack for facilitating the loading and unloading of a ladder from a motor vehicle, said vehicle having a side, said rack comprising:
   at least two support mechanisms supporting said ladder;
   a pivoting means for concurrently pivoting each of said at least two support mechanisms between a first position in which each of said at least two support mechanisms is situated above said vehicle and a second position in which each of said at least two support mechanisms is situated adjacent said vehicle side;
   a mounting means for fixedly mounting said pivoting means to said vehicle;
   a motion stabilizer mechanism mounted on each of said at least two support mechanisms for stabilizing and guiding the motion of said ladder as each of said at least two support mechanisms is pivoted between said first position and said second position,
   wherein each of said at least two support mechanisms comprising a width adjustment means for adjusting the ladder size carrying capacity of said at least two support mechanisms.

2. A ladder rack for facilitating the loading and unloading of a ladder from a motor vehicle, said vehicle having a side, said rack comprising:

at least two support mechanisms supporting said ladder;

a pivoting means for concurrently pivoting each of said at least two support mechanisms between a first position in which each of said at least two support mechanisms is situated above said vehicle and a second position in which each of said at least two support mechanisms is situated adjacent said vehicle side;

a mounting means for fixedly mounting said pivoting means to said vehicle;

a motion stabilizer mechanism mounted on each of said at least two support mechanisms for stabilizing and guiding the motion of said ladder as each of said at least two support mechanisms is pivoted between said first position and said second position;

wherein each of said at least two support mechanisms comprising a width adjustment means for adjusting the ladder size carrying capacity of said at least two support mechanisms;

wherein each said at least two support mechanisms further comprising;

at least one support bar;

said ladder resting on said at least one support bar when said support bars are in said first position;

at least one link bar;

one said at least one link bar extending from each said at least one support bar to said pivoting means; and a securing mechanism attached to each said at least one support bar for securing said ladder when said support mechanisms are in said first position;

wherein each said securing mechanism comprising:

a first bracket attached to each said at least one support bar distal said vehicle side;

said first bracket including a first bracket shoulder extending in a direction substantially transverse to each said at least one support bar;

a second bracket attached to each said at least one support bar proximate said vehicle side;

said second bracket including a second bracket shoulder extending in a direction substantially transverse to each said at least one support bar;

a third finger member located on said support mechanism intermediate said first bracket shoulder and said second bracket shoulder; and said third finger member extending in a direction normal to said at least one support bar;

wherein said width adjustment means comprising:

each said at least one support bar having two side surfaces and an axis;

each said at least one support bar having a plurality of transverse holes along said axis extending from one of said support bar side surfaces through the other of said support bar side surfaces;

said first bracket including two opposite edges which are parallel to said axis when said first bracket is attached to said at least one support bar;

said first bracket including at least one first bracket sliding member;

each said at least one first bracket sliding member extending from one of said first bracket edges in a direction perpendicular to said first bracket and distal to said first bracket shoulder;

each said at least one first bracket sliding member having at least one opening therethrough;

said first bracket and each said at least one first bracket sliding member sized and constructed so that each said at least one first bracket sliding member is in sliding abutment with one of said at least one support bar side surfaces and so that, as said at least one first bracket sliding member slides on said at least one support bar side surface, each said at least one first bracket sliding member opening becomes axially aligned with a different one of said plurality of support bar transverse holes thereby defining an axially aligned pair; and a width adjustment fastener which is selectively securely inserted through said axially aligned pair thereby fixing a specific distance between said first bracket shoulder and said second bracket shoulder.

3. A ladder rack as in claim 2, wherein said motion stabilizer mechanism comprising:

a hook mechanism having a straight section and a hook section;

said hook mechanism straight section attached to said support mechanism;

said hook mechanism hook section including an open end and an inner edge;

said hook section open end is proximal said first bracket; and said hook inner edge having a slide means allowing said ladder to slide thereon as each of said at least two support mechanisms is pivoted between said first position and said second position.

4. A ladder rack as in claim 3, wherein said slide means is constructed from a smooth non-abrasive rigid material.

5. A ladder rack as in claim 4, wherein said slide means comprises said hook section inner edge having a smooth, flat, and continuously contoured surface.

6. A ladder rack as in claim 4, wherein said slide means comprising a slider band fixedly attached to said hook section inner edge so that said slider band forms a smooth, flat, and continuously contoured surface.

7. A ladder rack as in claim 4, wherein said hook mechanism straight section comprises said third finger member.

8. A ladder rack as in claim 4, wherein said pivoting means further comprising a motion stop mechanism which acts to stop the pivoting motion of each of said at least two support mechanisms once said at least two support mechanisms have reached said second position from said first position.

9. A ladder rack as in claim 8, wherein:

said motion stop mechanism comprising one stop bar for each of said at least two support mechanisms and a stop pad for each of said at least one link bar;

each said stop bar fixedly attached to said mounting means;

each said stop bar having a top surface; and each said stop pad fixedly attached to said corresponding stop bar top surface so that each stop pad is located in the plane of rotation of said corresponding at least one link bar when said support mechanisms are moved between said first position and said second position.

10. A ladder rack as in claim 8, wherein said pivoting means further comprising:

a pivoting shaft;

an anchor brace for each of said at least two support mechanisms;

said pivoting shaft fixedly connected to each of said link bars;

said pivoting shaft journaled for rotation within each of said anchor braces; and each of said anchor braces fixedly attached to said mounting means.

11. A ladder rack as in claim 10, wherein said pivoting shaft comprising:

a first pivoting bar member proximal the rear of said vehicle;

a second pivoting bar member proximal the front of said vehicle;

a pivoting shaft adjustment means adjustably connecting said first pivoting bar member to said second pivoting bar member thereby enabling the variation of the overall length of said pivoting shaft; and a pivoting lever rotatably attached to said first pivoting bar member.

12. A ladder rack as in claim 11, wherein said pivoting shaft adjustment means comprising:

a sliding connection between said first pivoting bar member and said second pivoting bar member so that one of said pivoting bar members slides within the other of said pivoting bar members;

one of said pivoting bar members including a plurality of openings therethrough;

the other of said pivoting bar members including at least one aperture therethrough;

said sliding connection and pivoting bar members sized and constructed so that, as said pivoting bar members slide in relation to each other, each said at least one aperture becomes axially aligned with a different one of said plurality of openings thereby defining an axially aligned pair; and a fastening pin which is selectively securely inserted through said axially aligned pair thereby fixing said pivoting shaft at a specific length.

13. A ladder rack as in claim 10, wherein each of said anchor braces comprising:

two anchor brace units, each of said units including a top unit section and a side unit section;

each of said units fixedly attached to said mounting means;

each of said side unit sections including an edge;

each of said top unit sections extending from said corresponding side unit section edge in a direction normal to said side unit section;

each of said side unit sections having a cavity therethrough;

a bearing fixedly received within each of said side unit section cavities; and said pivoting shaft inserted and thereby journaled for rotation within said bearing of each of said side unit section cavities.

14. A ladder rack as in claim 10, wherein:

said vehicle comprising a van-type vehicle having a roof;

said mounting means comprising at least two bows and two bow braces fixedly attaching each of said at least two bows to said vehicle roof; and one of said anchor braces fixedly attached to each of said bows.

15. A ladder rack as in claim 10, wherein:

said vehicle comprising a pick-up truck vehicle having a truck bed;

said mounting means comprising a mounting structure fixedly attached to said bed and extending upwards from said bed; and each of said anchor braces fixedly attached to said mounting structure.

16. A ladder rack as in claim 10, wherein:

the connection between each said at least one support bar and said corresponding link bar defines an angle on said vehicle side of said connection that is between 30° and 60°; and the relative location of each of said support mechanisms and said vehicle side defines an angle on said vehicle side of said relative location that is an obtuse angle.

17. A ladder rack for facilitating the loading and unloading of a ladder from a motor vehicle, said vehicle having a side, said rack comprising:

at least two support mechanisms supporting said ladder;

a pivoting means for concurrently pivoting each of said at least two support mechanisms between a first position in which each of said at least two support mechanisms is situated above said vehicle and a second position in which each of said at least two support mechanisms is situated adjacent said vehicle side;

a mounting means for fixedly mounting said pivoting means to said vehicle;

a motion stabilizer mechanism mounted on each of said at least two support mechanisms for stabilizing and guiding the motion of said ladder as each of said at least two support mechanisms is pivoted between said first position and said second position;

wherein each of said at least two support mechanisms comprising a width adjustment means for adjusting the ladder size carrying capacity of said at least two support mechanisms;

wherein each said at least two support mechanisms further comprising:

at least one support bar;

said ladder resting on said at least one support bar when said support bars are in said first position;

at least one link bar;

one said at least one link bar extending from each said at least one support bar to said pivoting means; and a securing mechanism attached to each said at least one support bar for securing said ladder when said support mechanisms are in said first position;

wherein each said securing mechanism comprising:

a first bracket attached to each said at least one support bar distal said vehicle side;

said first bracket including a first bracket shoulder extending in a direction substantially transverse to each said at least one support bar;

a second bracket attached to each said at least one support bar proximate said vehicle side;

said second bracket including a second bracket shoulder extending in a direction substantially transverse to each said at least one support bar;

a third finger member located on said support mechanism intermediate said first bracket shoulder and said second bracket shoulder; and said third finger member extending in a direction normal to said at least one support bar;

wherein said width adjustment means comprising:

each said at least one support bar being at least partially hollow thereby defining a cavity therein at the end of said support bar proximate said first bracket;

a support bar sliding member slidably disposed within each of said support bar cavities;

said first bracket fixedly attached to each of said support bar sliding members;

each said support bar sliding member having a support bar sliding member axis and two support bar side surfaces;

each said support bar sliding member having at least one opening along said support bar sliding member axis extending from one of said support bar sliding member side surfaces through the other of said support bar sliding member side surfaces;

each said at least one support bar having two side surfaces and an axis;

each said at least one support bar having a plurality of transverse holes along said support bar axis extending from one of said support bar side surfaces through the other of said support bar side surfaces;

each said at least one support bar and said support bar sliding member sized and constructed so that, as each said support bar sliding member slides within its corresponding support bar, each said at least one support bar sliding member opening becomes axially aligned with a different one of said plurality of support bar transverse holes thereby defining an axially aligned pair; and a width adjustment fastener which is selectively securely inserted through said axially aligned pair thereby fixing a specific distance between said first bracket shoulder and said second bracket shoulder.

18. A ladder rack as in claim 17, wherein said motion stabilizer mechanism comprising:

a hook mechanism having a straight section and a hook section;

said hook mechanism straight section attached to said support mechanism;

said hook mechanism hook section including an open end and an inner edge;

said hook section open end is proximal said first bracket; and said hook inner edge having a slide means allowing said ladder to slide thereon as each of said at least two support mechanisms is pivoted between said first position and said second position.

19. A ladder rack as in claim 18, wherein said slide means is constructed from a smooth non-abrasive rigid material.

20. A ladder rack as in claim 19, wherein said slide means comprises said hook section inner edge having a smooth, flat, and continuously contoured surface.

21. A ladder rack as in claim 19, wherein said slide means comprising a slider band fixedly attached to said hook section inner edge so that said slider band forms a smooth, flat, and continuously contoured surface.

22. A ladder rack as in claim 19, wherein said hook mechanism straight section comprises said third finger member.

23. A ladder rack as in claim 19, wherein said pivoting means further comprising a motion stop mechanism which acts to stop the pivoting motion of each of said at least two support mechanisms once said at least two support mechanisms have reached said second position from said first position.

24. A ladder rack as in claim 23, wherein:

said motion stop mechanism comprising one stop bar for each of said at least two support mechanisms and a stop pad for each of said at least one link bar;

each said stop bar fixedly attached to said mounting means;

each said stop bar having a top surface; and each said stop pad fixedly attached to said corresponding stop bar top surface so that each stop pad is located in the plane of rotation of said corresponding at least one link bar when said support mechanisms are moved between said first position and said second position.

25. A ladder rack as in claim 23, wherein said pivoting means further comprising:

a pivoting shaft;

an anchor brace for each of said at least two support mechanisms;

said pivoting shaft fixedly connected to each of said link bars;

said pivoting shaft journaled for rotation within each of said anchor braces; and each of said anchor braces fixedly attached to said mounting means.

26. A ladder rack as in claim 25, wherein said pivoting shaft comprising:

a first pivoting bar member proximal the rear of said vehicle;

a second pivoting bar member proximal the front of said vehicle;

a pivoting shaft adjustment means adjustably connecting said first pivoting bar member to said second pivoting bar member thereby enabling the variation of the overall length of said pivoting shaft; and a pivoting lever rotatably attached to said first pivoting bar member.

27. A ladder rack as in claim 26, wherein said pivoting shaft adjustment means comprising:

a sliding connection between said first pivoting bar member and said second pivoting bar member so that one of said pivoting bar members slides within the other of said pivoting bar members;

one of said pivoting bar members including a plurality of openings therethrough;

the other of said pivoting bar members including at least one aperture therethrough;

said sliding connection and pivoting bar members sized and constructed so that, as said pivoting bar members slide in relation to each other, each said at least one aperture becomes axially aligned with a different one of said plurality of openings thereby defining an axially aligned pair; and a fastening pin which is selectively securely inserted through said axially aligned pair thereby fixing said pivoting shaft at a specific length.

28. A ladder rack as in claim 25, wherein each of said anchor braces comprising:

two anchor brace units, each of said units including a top unit section and a side unit section;

each of said units fixedly attached to said mounting means;

each of said side unit sections including an edge;

each of said top unit sections extending from said corresponding side unit section edge in a direction normal to said side unit section;

each of said side unit sections having a cavity therethrough;

a bearing fixedly received within each of said side unit section cavities; and said pivoting shaft inserted and thereby journaled for rotation within said bearing of each of said side unit section cavities.

29. A ladder rack as in claim 25, wherein:

said vehicle comprising a van-type vehicle having a roof;

said mounting means comprising at least two bows and two bow braces fixedly attaching each of said at least two bows to said vehicle roof; and one of said anchor braces fixedly attached to each of said bows.

30. A ladder rack as in claim 25, wherein:

said vehicle comprising a pick-up truck vehicle having a truck bed;

said mounting means comprising a mounting structure fixedly attached to said bed and extending upwards from said bed; and each of said anchor braces fixedly attached to said mounting structure.

31. A ladder rack as in claim 25, wherein:

the connection between each said at least one support bar and said corresponding link bar defines an angle on said vehicle side of said connection that is between 30° and 60°; and the relative location of each of said support mechanisms and said vehicle side defines an angle on said vehicle side of said relative location that is an obtuse angle.

* * * * *